United States Patent [19]
Masak

[11] 3,981,014
[45] Sept. 14, 1976

[54] INTERFERENCE REJECTION SYSTEM FOR MULTI-BEAM ANTENNA

[75] Inventor: Raymond J. Masak, East Northport, N.Y.

[73] Assignee: Hazeltine Corporation, Greenlawn, N.Y.

[22] Filed: Aug. 12, 1974

[21] Appl. No.: 496,494

[52] U.S. Cl. .................... 343/100 LE; 343/100 CL
[51] Int. Cl.² ........................................ H04B 7/00
[58] Field of Search ............ 343/100 LE, 100 CL; 325/371; 181/15.5 CC, 15.5 SC

[56] References Cited
UNITED STATES PATENTS

| | | | |
|---|---|---|---|
| 3,177,489 | 4/1965 | Saltzberg | 343/100 LE |
| 3,412,405 | 11/1968 | Crotty et al. | 343/100 LE |
| 3,435,453 | 3/1969 | Howard | 343/100 LE |
| 3,740,749 | 6/1973 | Marom | 343/100 LE |
| 3,763,490 | 10/1973 | Hadley et al. | 343/100 LE |

*Primary Examiner*—T.H. Tubbesing
*Assistant Examiner*—T. M. Blum

[57] ABSTRACT

Disclosed is a system for receiving a signal from a known direction and rejecting interfering signals arriving from other directions. The system makes use of a multibeam antenna having multiple ports corresponding to the multiple beams. The port corresponding to the beam in the direction of the desired signal is connected directly to a receiver while the outputs of the remaining antenna ports are used to cancel interfering signals arriving on their corresponding beams.

5 Claims, 4 Drawing Figures

INTERFERENCE REJECTION SYSTEM FOR MULTI-BEAM ANTENNA

BACKGROUND OF THE INVENTION

The invention herein described was made in the course of or under a contract with the Department of the Navy.

This invention relates to systems for receiving wave energy signals and particularly to systems which adaptively suppress interference in the received signal.

Prior art adaptive canceling systems have most often been used in connection with radar systems. A radar system usually uses a highly directional antenna which has a main beam and many sidelobes. A signal within the received frequency band of the radar may cause radar jamming by having sufficient amplitude to saturate the radar receiver when that signal is incident on the antenna sidelobes as well as the main beam. Prior art systems have been developed for cancelling this type of interference in a radar system. These prior art systems usually use an omni-directional auxiliary antenna to receive the interfering signal in an auxiliary channel. The interfering signal in the auxiliary channel is combined with the signal received in the main radar channel to adaptively cancel the interfering signal when the interfering signal is present on the radar sidelobes.

This system minimizes the effects of the interfering signal to only those portions of the radar scanning time when the main beam is pointed at the interfering signal source. This facilitates location of the interfering signal source and prevents that source from interfering with the radar detection of other targets.

The prior art radar adaptive sidelobe canceller usually discriminates between an interfering signal and a desired radar return signal on the basis of signal format. For example, a radar usually transmits short pulses of R. F. energy to facilitate range finding. An interfering signal to be effective is most often a more continuous signal and therefore the adaptive canceling circuit may be designed to respond only to signals having a duration substantially greater than the duration of the desired radar pulse. In other cases the radar signal may be a phase coded or frequency chirped signal which may be distinguished from the undesired interfering signal according to the known characteristics of the desired radar signal.

While useful in system wherein the signal format of the desired signal is easily distinguished from the signal format of the interfering signal, such as radar systems and communications systems using predetermined codes, the above described prior art adaptive sidelobe canceling systems are not usable in systems where there is no distinguishing feature between the desired signal and the interfering signal. For example, in a system where the desired signal is an amplitude modulated signal and the interfering signal is also an amplitude modulated signal in the same frequency band, discrimination on the basis of signal format is not possible. In some of these systems it is possible to distinguish between a desired signal and an interfering signal on the basis of a priori knowledge of the location of the source of the desired signal. Very often sufficient discrimination between the desired signal and the interfering signal may be accomplished using only a directional antenna. In some instances, however, the interfering signal may be of such a greater intensity than the desired signal that the interfering signal received on an antenna sidelobe has greater signal strength in the receiver than the desired signal received on the antenna main beam. This is possible, for example, in an instance where a shore based communications terminal which is seeking to receive a desired signal from ships far at sea is located in the vicinity of another transmitting terminal and receives interference from that transmitting terminal.

OBJECTS OF THE INVENTION

It is therefore an object of the present invention to provide a system for receiving desired wave energy signals and suppressing interfering signals.

It is a further object of the present invention to provide such a system wherein discrimination between the desired signal and the interfering signal is on the basis of direction of arrival of the respective signals.

It is a still further object of the present invention to provide such a system using an antenna which is responsive to signals originating in multiple regions of space and has multiple output ports each primarily responsive to signals originating in one of the regions of space.

SUMMARY OF THE INVENTION

In accordance with the present invention there is provided a system for receiving desired wave energy signals from at last one angular region of space within the area covered by the system and for suppressing interfering signals from at least one other angular region. The system includes antenna means, having a first plurality of antenna elements and a second plurality of output ports for receiving wave energy signals from said coverage area and for developing at each of said output ports a signal primarily representative of the wave energy signals received from a corresponding predetermined angular region of said coverage area. The system further includes means for combining supplied signals in accordance with a predetermined function to develop an output signal. It also includes means for coupling signals, including desired and interfering signal components, from a selected output port of said antenna means to an input of said combining means. Also included are means for developing a correction signal. It includes means for mixing the output signal from said combining means and signals from another output port of said antenna means corresponding to said other angular region thereby to develop a control signal. Further included are means for mixing said control signal and the signals from said other output port of said antenna means thereby to develop a correction signal. Finally, there is included means for coupling said correction signal to an input of said combining means thereby causing suppression of said interfering signal components in said output signal.

For a better understanding of the present invention together with other and further objects thereof reference is had to the following description taken in conjunction with the accompanying drawings and its scope will be pointed out in the appended claims.

DESCRIPTION AND OPERATION OF THE FIG. 1 SYSTEM

Figure 1:
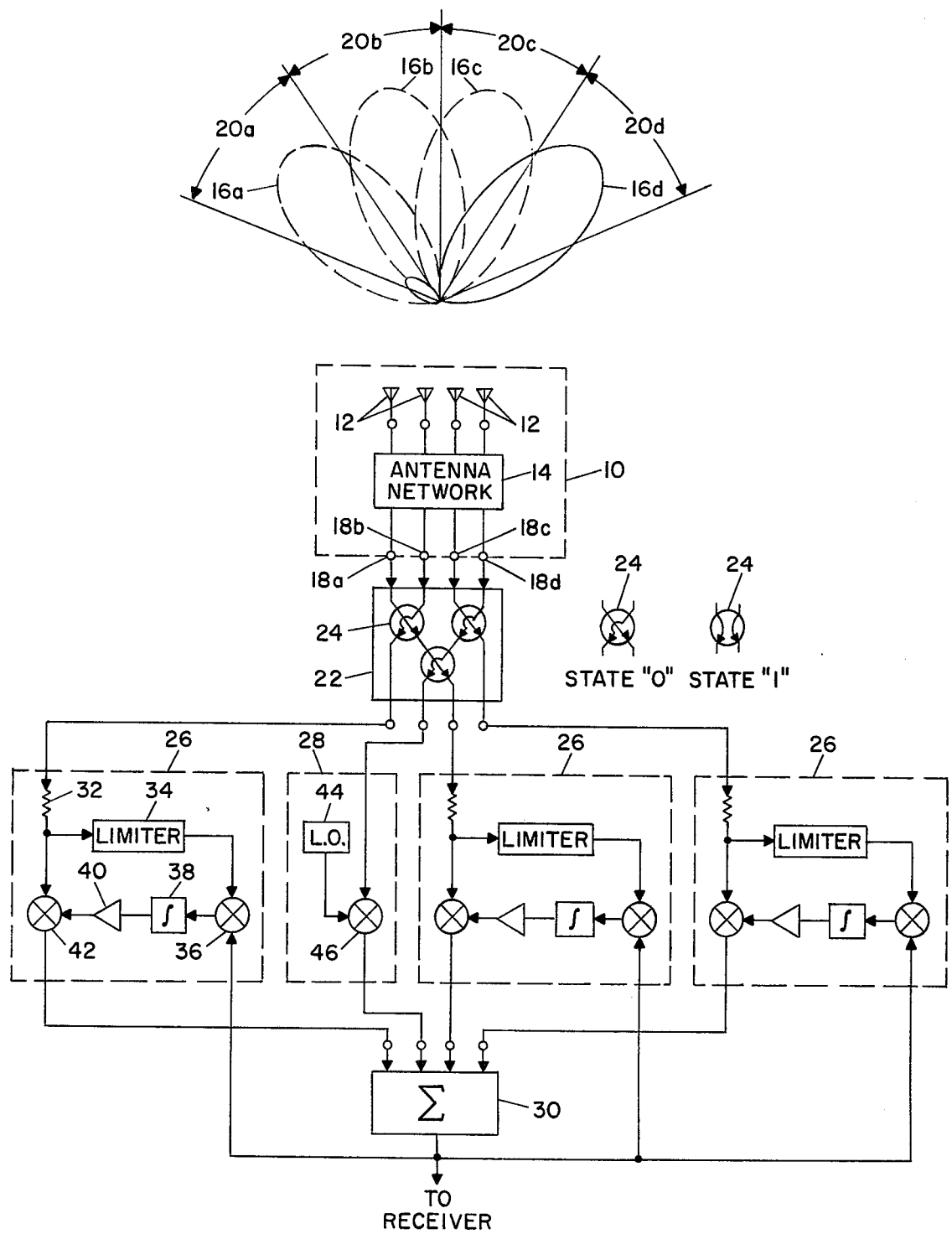
FIG. 1 is a schematic diagram of a system constructed in accordance with the present invention.

FIG. 1 shows a system constructed in accordance with the present invention. Shown in FIG. 1 is antenna unit 10 which includes a plurality of antenna elements 12 and an antenna beam forming network 14 connected to the antenna units 12. Beam forming network 14 may be a well-known Butler Matrix or any other type suitable for providing antenna element phasing. Antenna unit 10 is capable of generating antenna beams 16a, 16b, 16c and 16d in response to wave energy signals supplied to the ports 18a, 18b, 18c and 18d of antenna network 14. Because of the reciprocal nature of antenna unit 10, signals originating in angular region 20a will be primarily received by antenna beam 16a and primarily supplied to antenna port 18a. Likewise, signals from angular regions of space 20b, 20c and 20d will be primarily supplied to corresponding antenna ports 18b, 18c and 18d, respectively.

Each of the antenna ports 18 is therefore primarily responsive to signals received from a corresponding region of space, but those skilled in the art will also recognize that signals from directions outside of the corresponding angular region of space will also appear in each of the antenna ports because of the imperfections of antenna beam shaping, principally beam fall off and antenna sidelobes. In FIG. 1 antenna beam 16d is shown, for example, to include a main beam primarily responsive to signals originating in angular region of space 20d, and also a sidelobe which is responsive to a lesser degree to signals originating in region of space 20a. Hence antenna port 18d is primarily responsive to signals originating in angular region 20d, and also responsive to a lesser extent to signals originating in angular region 20a. It may also be seen that antenna port 18d will be responsive to signals originating in portions of spacial region 20c because of the antenna beam fall off in this angular region.

In the FIG. 1 antenna system there is further provided a switching matrix 22, which in the illustrated embodiment comprises three transfer switches 24. Switches 24 each have two inputs and two outputs. Switches 24 may be placed in two distinct states indicated as state "0" and state "1" in FIG. 1, which indicates the route of coupling between the two output ports and the two input ports of each switch 24. Consideration of the arrangement of switching matrix 22 makes it obvious that any of the outputs 18 of antenna unit 10 may be connected to unit 28, while the remaining outputs are connected to one of the three units 26. Unit 28 corresponds to the main channel of the FIG. 1 system, units 26 correspond to interference suppression channels of the FIG. 1 system.

In the FIG. 1 embodiment unit 28 comprises local oscillator 44 and mixer 46. When switching matrix 22 is in the state indicated in FIG. 1, signals originating in the region of space 20d corresponding to antenna port 18d will be primarily supplied to mixer 46. Mixer 46 will develop an intermediate signal primarily representative of signals originating within region of space 20d and supply that signal to one of the input ports of combiner 30. The output of combiner 30 is supplied to a conventional receiver adapted to utilize signals at the intermediate frequency developed at mixer 46. Unit 28 thereby comprises means for coupling signals from the antenna port corresponding to the selected region of space to combiner 30.

Units 26 are all identical. Each is connected by switching matrix 22 to one of the remaining outputs 18a, 18b and 18c of antenna unit 10. The units 26 are also connected to the remaining inputs of combiner 30 and comprise means responsive to the output of combiner 30 and to the signals at the remaining antenna ports 18a, 18b and 18c for developing a correction signal to be supplied to combiner 30. Units 26 include an attenuator 32 which tends to reduce the level of signal supplied at the input of unit 26. Following attenuator 32, the signal from the antenna port 18 is supplied to mixer 42 and also to limiter 34. The local oscillator port of mixer 42 is supplied with a control signal which will be described below. Unit 26 further includes mixer 36 to which is supplied the output of limiter 34 and a portion of the output signal of combiner 30. Mixer 36 develops a control signal which has the same frequency as the signal supplied by local oscillator 44. The control signal represents the portion of the signal present at the antenna port to which unit 26 is connected which is also present at the output of the combining unit 30. There is further supplied in unit 26 integrator 38 and amplifier 40 by which the control signal output of mixer 36 is supplied to mixer 42. Integrator 38 typically comprises a narrowband filter. The bandwidth of the filter does not limit the bandwidth of the interfering signal to be suppressed, but merely determines the rate at which the control signal may change, and hence determines the response time of the circuit. Limiter 34 and integrator 38 are provided to insure the stability of control signal developing means 26 in the presence of random noise and spurious signals. The control signal is supplied to mixer 42 with a phase such that the output signal of mixer 42 is opposite in phase and equal in amplitude to the components of the output of mixer 46 which are also present in the input to unit 26.

Figure 3:
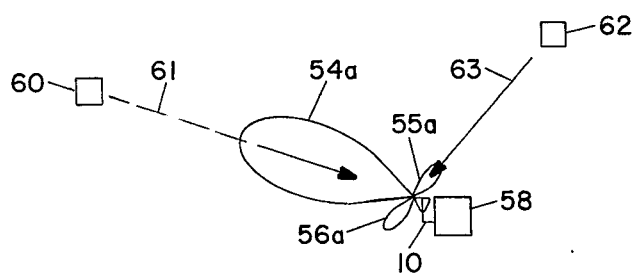
FIG. 3 is an illustration of a prior art antenna system receiving a desired signal having an interfering signal on an antenna sidelobe.
Figure 4:
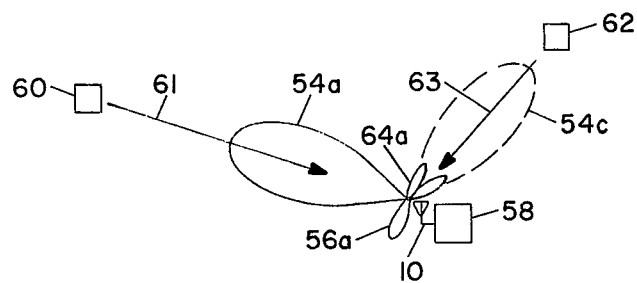
FIG. 4 illustrates the operation of the antenna system of FIG. 1 for suppressing an interfering signal.

The operation of the system of FIG. 1 is illustrated in FIGS. 3 and 4. In FIG. 3 there is shown a terminal for receiving signals which includes an antenna unit 10 radiating an antenna beam having a main lobe 54a and sidelobes 55a and 56a. A desired signal is radiated by terminal 60 in direction 61 and received on antenna main beam 54a. Referring to FIG. 1 the signal received on main beam 54a would be supplied to coupling means 28 and eventually to combining means 30. If no other signals are present, the only signals supplied to units 26 are representative of the desired signal which is incident on sidelobes of the antenna beams corresponding to the antenna ports to which units 26 are connected. These sidelobes are typically much weaker than the main lobe of the receiving antenna and hence a considerably smaller signal is supplied to units 26 than to unit 28. Units 26 further include attenuator 32 which further reduces the level of the desired signal in unit 26. Units 26 develop a correction signal, representative of the very weak desired signal received on antenna sidelobes and attenuated by attenuator 32, and which are therefore very much weaker than the signal supplied to combining means 30 by coupling means 28. In the absence of an interfering signal units 26 would therefore be essentially shut off and supply only a very weak correction signal to combining means 30.

In the prior art system illustrated in FIG. 3 it is possible for an interfering transmitter 62 to radiate a signal in direction 63 which is received by terminal 58 on sidelobe 55a. In prior art systems it is possible because of the relative range and transmitter power of transmitter 62 that the signal received on sidelobe 55a be greater than the desired signal received on main lobe 54a and therefore interfere with the reception of the desired signal radiated by terminal 60. This interference may be of an intentional nature, or it may be unintentional in nature and merely caused by the existence of another station utilizing the same frequency allocation.

In a case where terminal 58 is equipped with an interference rejection system as described in FIG. 1 the interference arising from transmitter 62 would be suppressed in the receiver. For example, the desired signal from transmitter 60 is received on antenna beam 54a and primarily supplied to coupling unit 28 and combining unit 30. The interfering signal radiated by transmitter 62 would be received primarily on another main beam of antenna unit 10, for example beam 54c shown in FIG. 4, and be supplied to one of units 26 as well as being received on sidelobe 55a and supplied to unit 28. Initially, when transmitter 62 starts operating its signal will appear at the output of combining unit 30 in proportion to the amount received by sidelobe 55a. The signal from transmitter 62 will also be supplied, but with greater magnitude to the input of the unit 26 connected to the antenna port corresponding to beam 54c. Attenuator 32 reduces the amplitude of the interfering signal in unit 26 to approximately the maximum value which could be expected to be received on sidelobe 55a. Mixer 36 responds to the interfering signal received in antenna beam 54c and also to the interfering signal at the output of combining unit 30 to form a control signal. The control signal is supplied by integrator 38 and amplifier 40 to mixer 42 to develop a correction signal which is equal in amplitude and opposite in phase to the interfering signal as it exists at the output of combining unit 30 and supplies that control signal to the input of combining unit 30 to effect a suppression of the interfering signal in the output of control unit 30. The result of the suppression at combining unit 30 is an effective antenna pattern with a null in the direction of origin of the interfering signal as illustrated by sidelobes 64a in FIG. 4.

Figure 2:
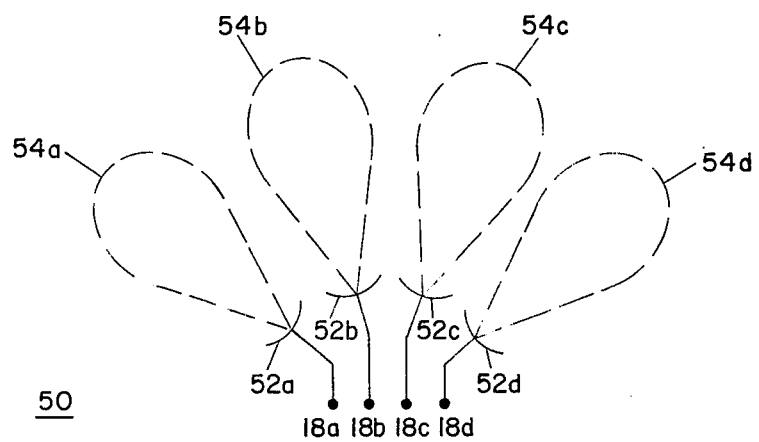
FIG. 2 shows an alternate antenna unit for use in the antenna system of FIG. 1.

It will be evident to those skilled in the art that if additional interfering signals are present in the region of space corresponding to the antenna ports connected to additional units 26, those units will similarly respond and provide a control signal suitable for suppressing the interfering signal in the output of control unit 30. The significant advantage of the present invention is that the cancellation of signals is in no way dependent upon signal format, but merely upon direction of signal arrival. It is therefore possible to effectively suppress a signal of exactly the same format as the desired signal. FIG. 2 shows an alternate antenna unit which may be used in the system of FIG. 1. The FIG. 2 antenna unit 50 consists of individual antenna radiators 52, each oriented to radiate a beam into a different region of space. In the FIG. 2 antenna unit the output of each of the antenna radiators 52 corresponds to one of the antenna ports 18.

It will be evident to those skilled in the art that the present invention may have many different embodiments. In some cases where interference is caused by a transmitter at a location which is fixed with respect to the terminal using the present invention it would be necessary to have only a single antenna beam pointed in the desired region of space and a single auxiliary antenna beam pointed into the region of space from which the interfering signal originates to achieve effective cancellation. In other more complicated systems the location of the desired signal and interfering signal may be constantly changing, as in the case where the system is installed on an aircraft. In such an embodiment the switching matrix 22 of FIG. 1 would be required to change the region of space from which the desired signal is to be received as the direction of the desired transmitter changes with respect to the coordinates of the aircraft.

While the system described above utilizes IF conversion in the process of developing a correction signal, those skilled in the art will recognize that the correction process can be achieved at the r.f. carrier frequency. A circuit for developing such a correction signal at r.f. has been described in applicant's co-pending application, Ser. No. 489,623, filed July 18, 1974 and entitled "Spectrum Notcher," which is assigned to the same assignee as the present application.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for receiving desired wave energy signals from at least one angular region of space within the area covered by the system and for suppressing interfering signals from at least one other angular region, comprising:

antenna means, having a first plurality of antenna elements and a second plurality of output ports, for receiving wave energy signals from said coverage area and for developing at each of said output ports a signal primarily representative of the wave energy signals received from a corresponding predetermined different angular region of said coverage area whereby said coverage area is effectively subdivided into a second plurality of angular regions, each of which is represented by the signal developed at a corresponding one of said output ports;

means for combining supplied signals in accordance with a predetermined function to develop an output signal;

means for coupling signals, including desired and interfering signal components, from at least one selected output port of said antenna means to an input of said combining means;

means for developing a correction signal comprising:
means for mixing the output signal from said combining means and signals from another output port of said antenna means corresponding to said other angular region thereby to develop a control signal;

means for mixing said control signal and the signals from said other output port of said antenna means thereby to develop a correction signal;

and means for coupling said correction signal to an input of said combining means thereby causing suppression of said interfering signal components in said output signal.

2. A system as specified in claim 1 which includes a plurality of said means for developing a correction signal, each being responsive to signals from a different one of the output ports of said antenna means, other than said selected output port;

and wherein said correction signal coupling means couples all of said correction signals to inputs of said combining means.

3. A system as specified in claim 1 wherein said antenna means comprises an array of antenna elements coupled to an antenna beam-forming network having said second plurality of output ports.

4. A system as specified in claim 1 wherein said antenna means comprises a plurality of directional radiating antennas each having an output port and each oriented to receive signals primarily from a different angular region of space within the coverage area.

5. A system as specified in claim 1 wherein said means for combining supplied signals is an adder.

* * * * *